INVENTORS:
HARMON L. SHAW
and FRANK E. FROST.

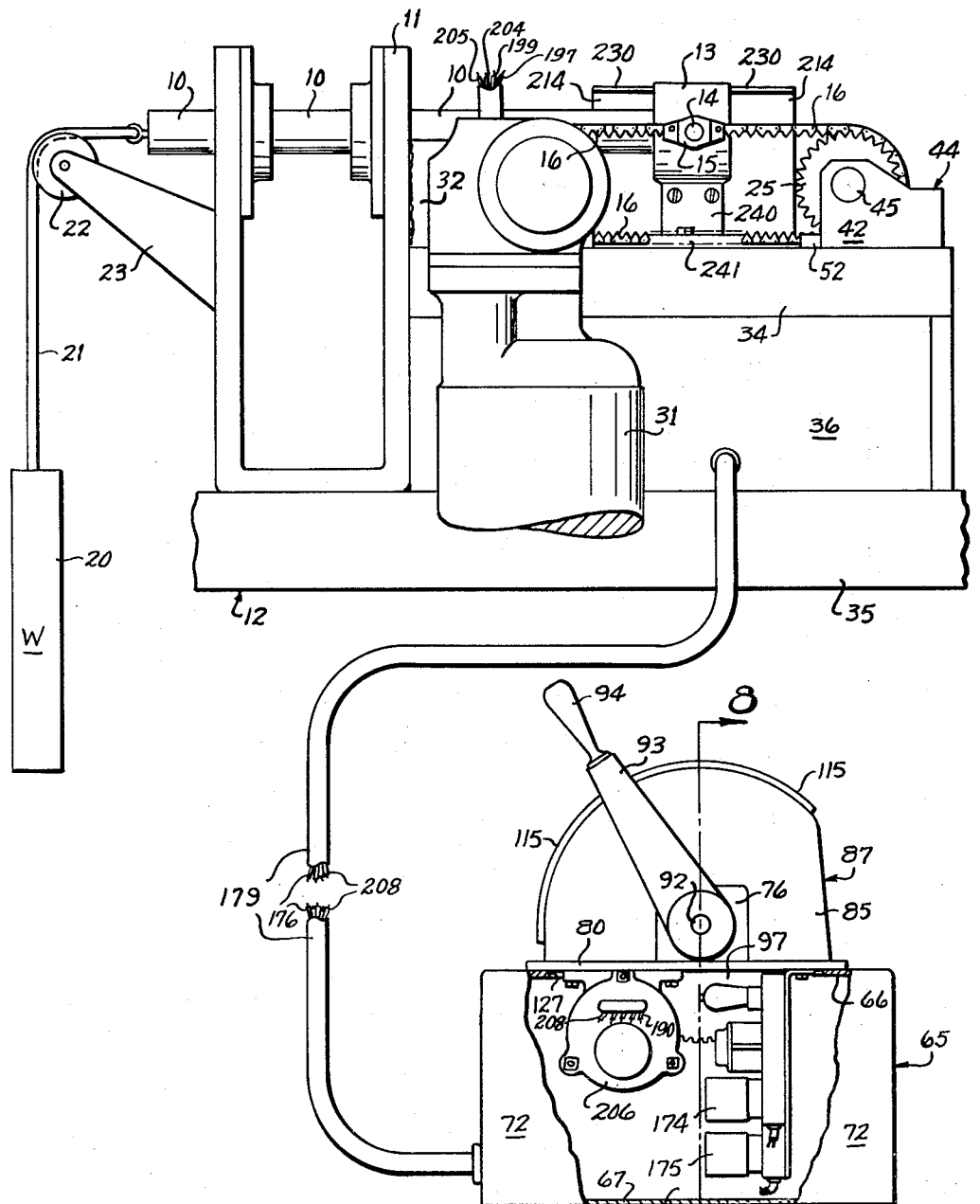

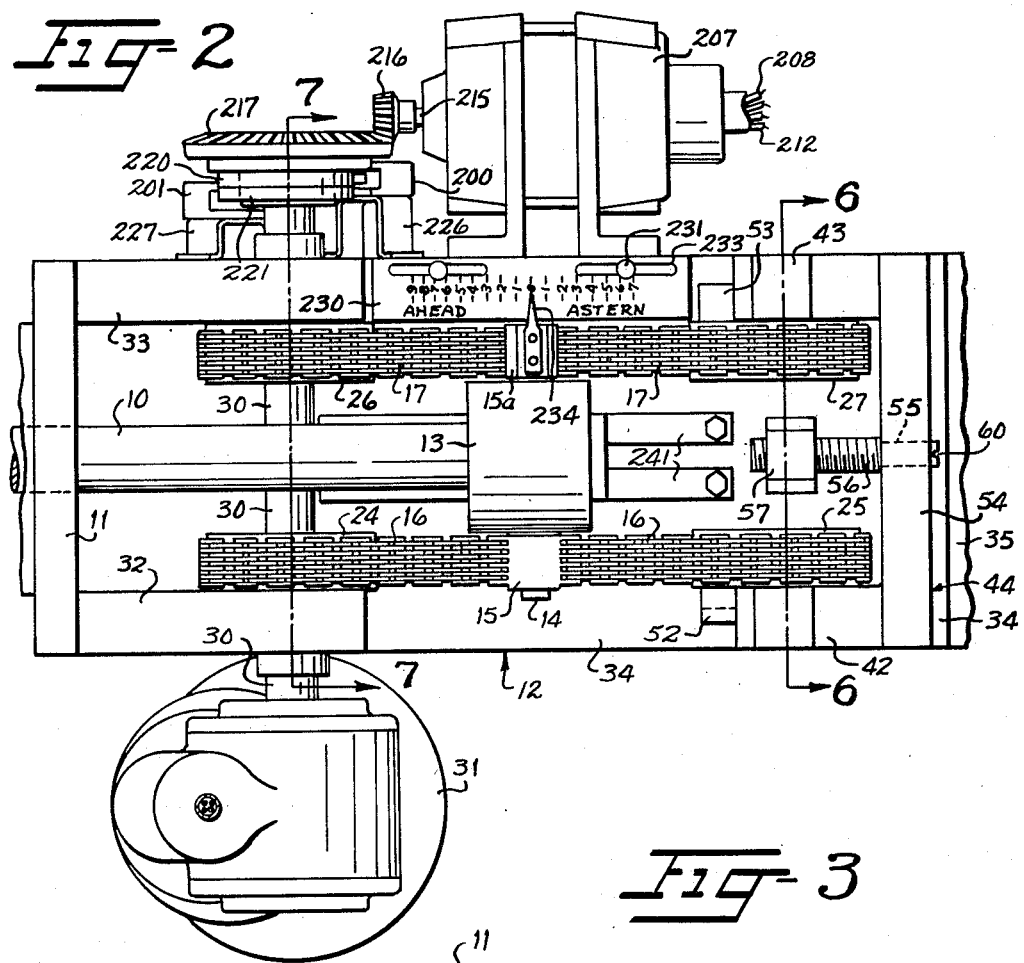
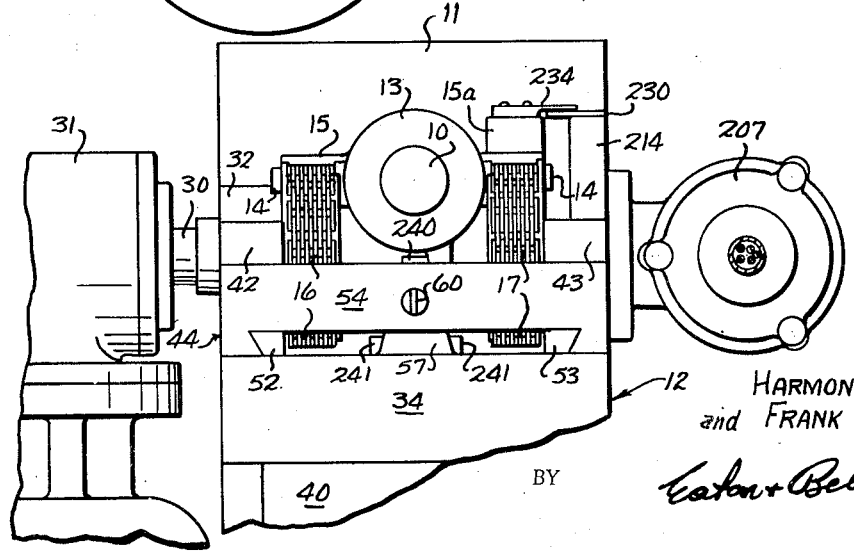

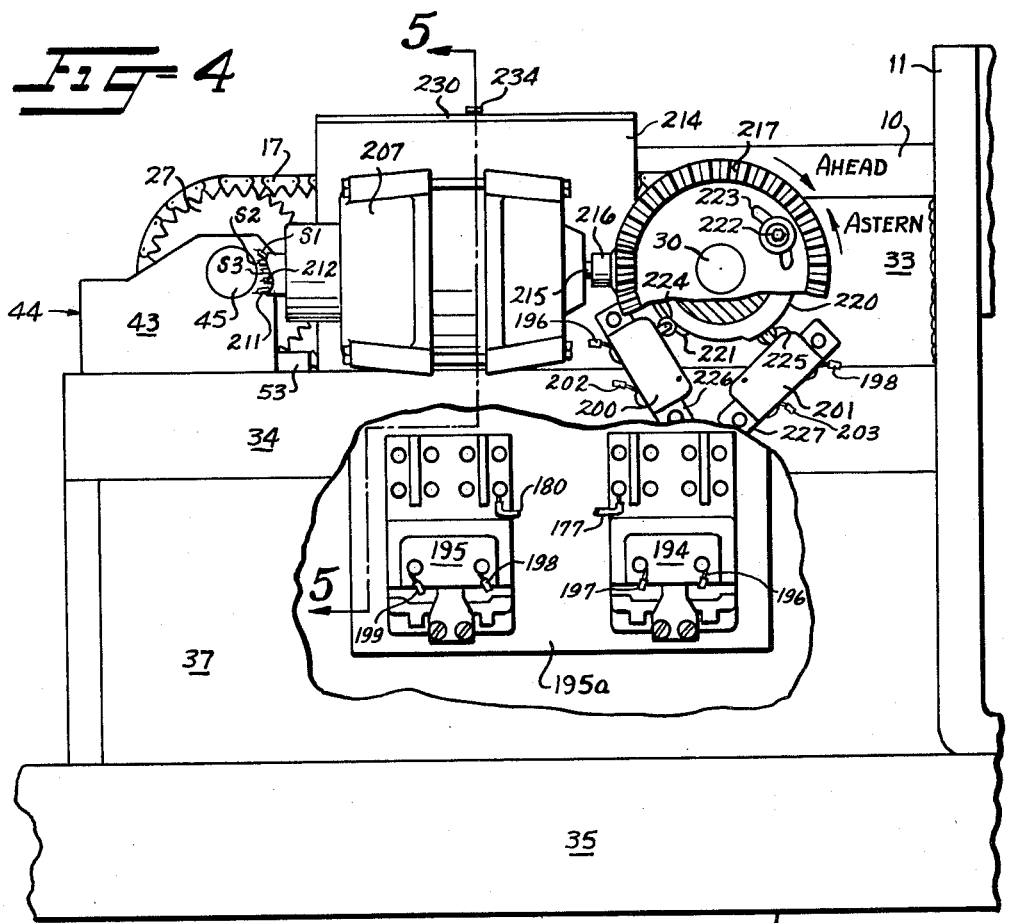
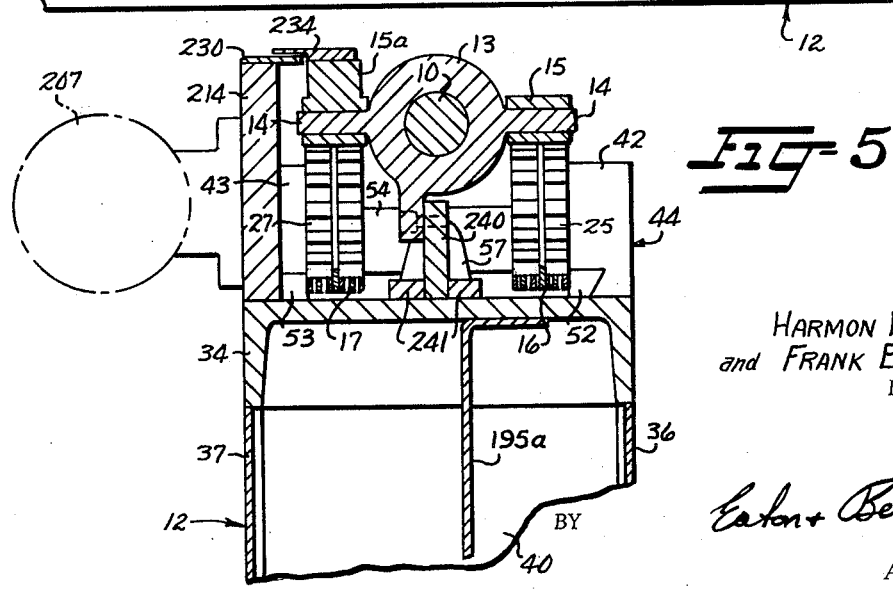

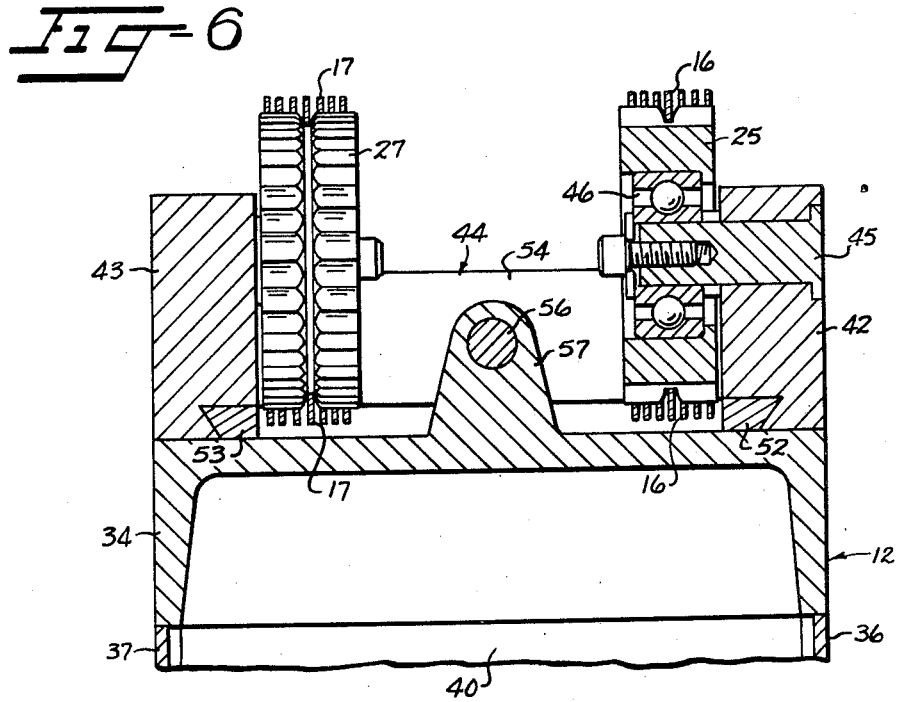
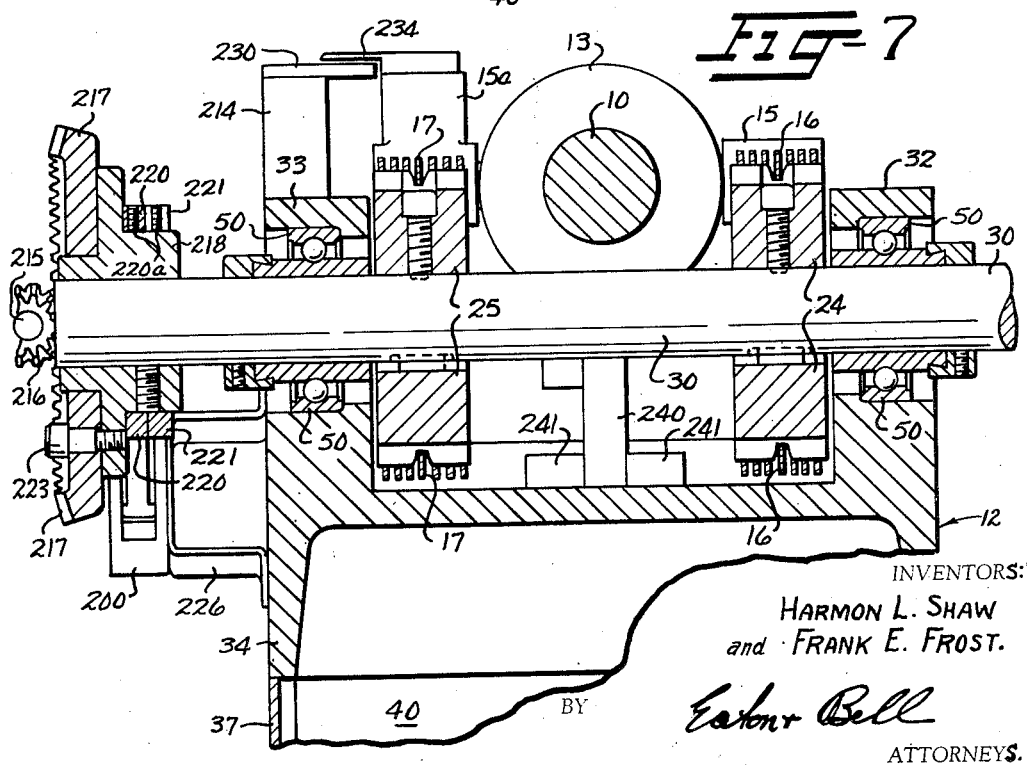

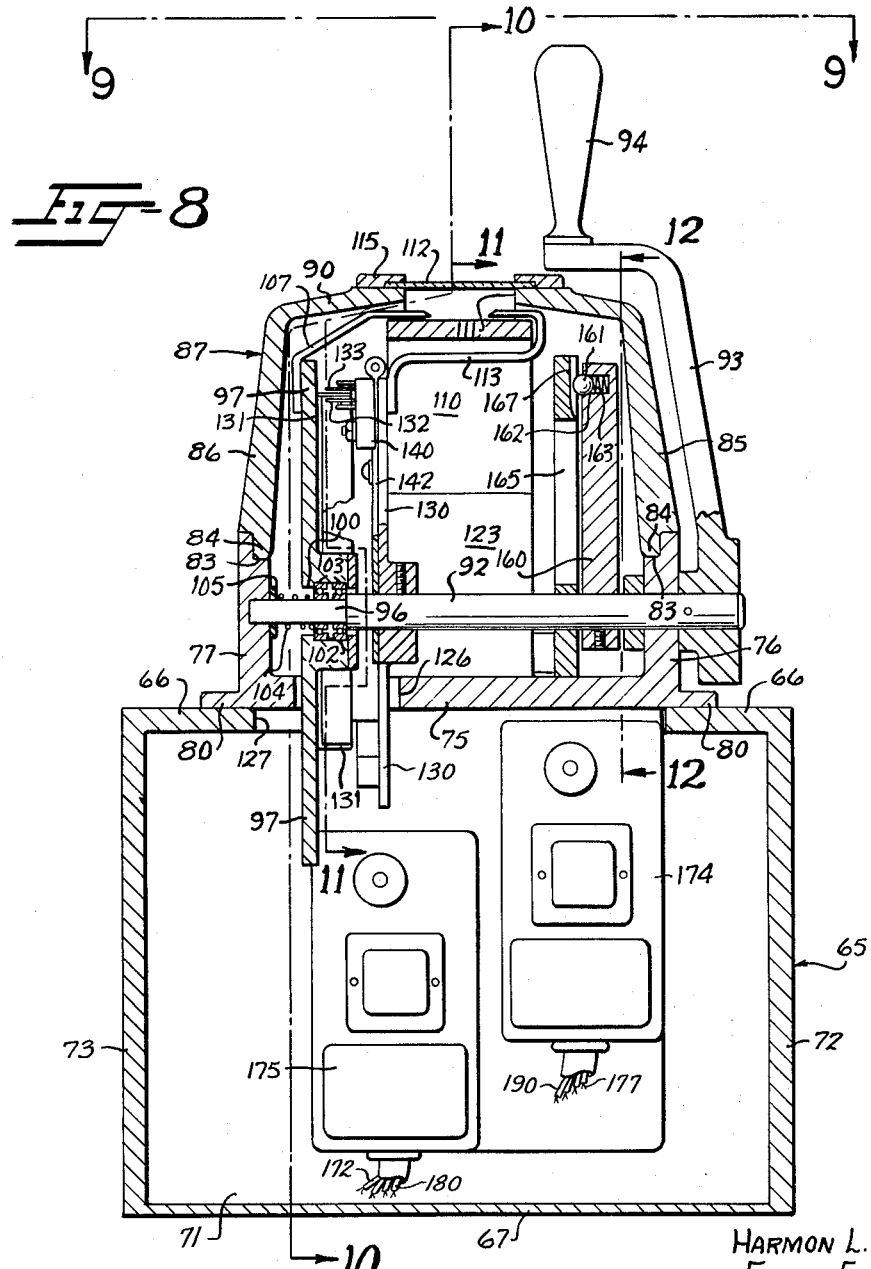

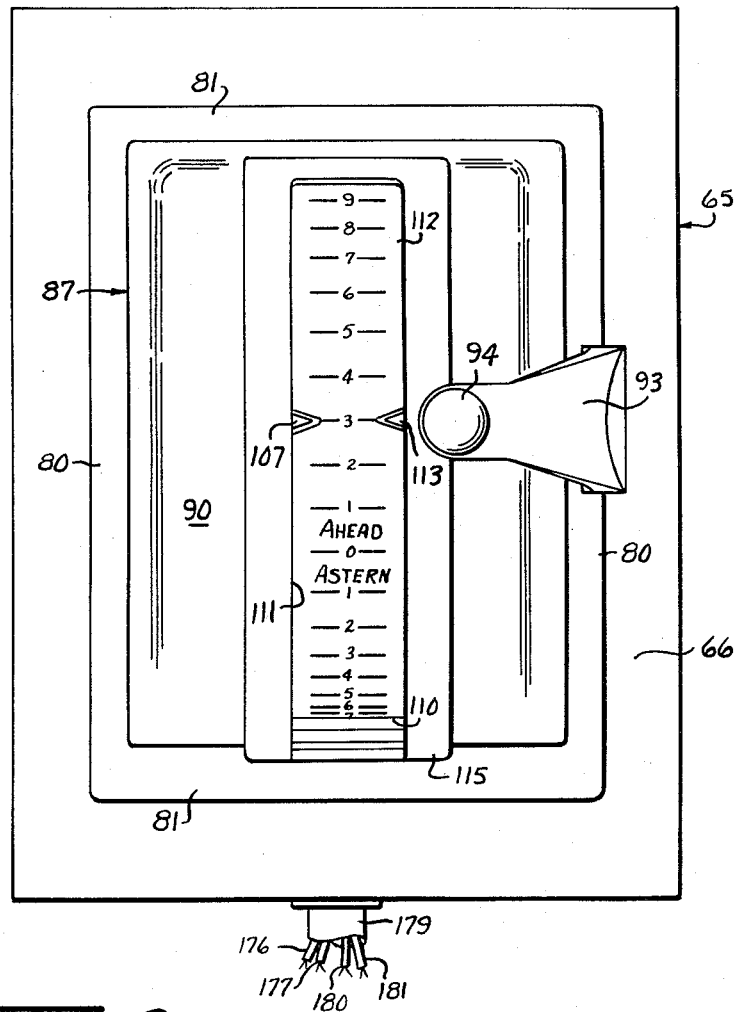

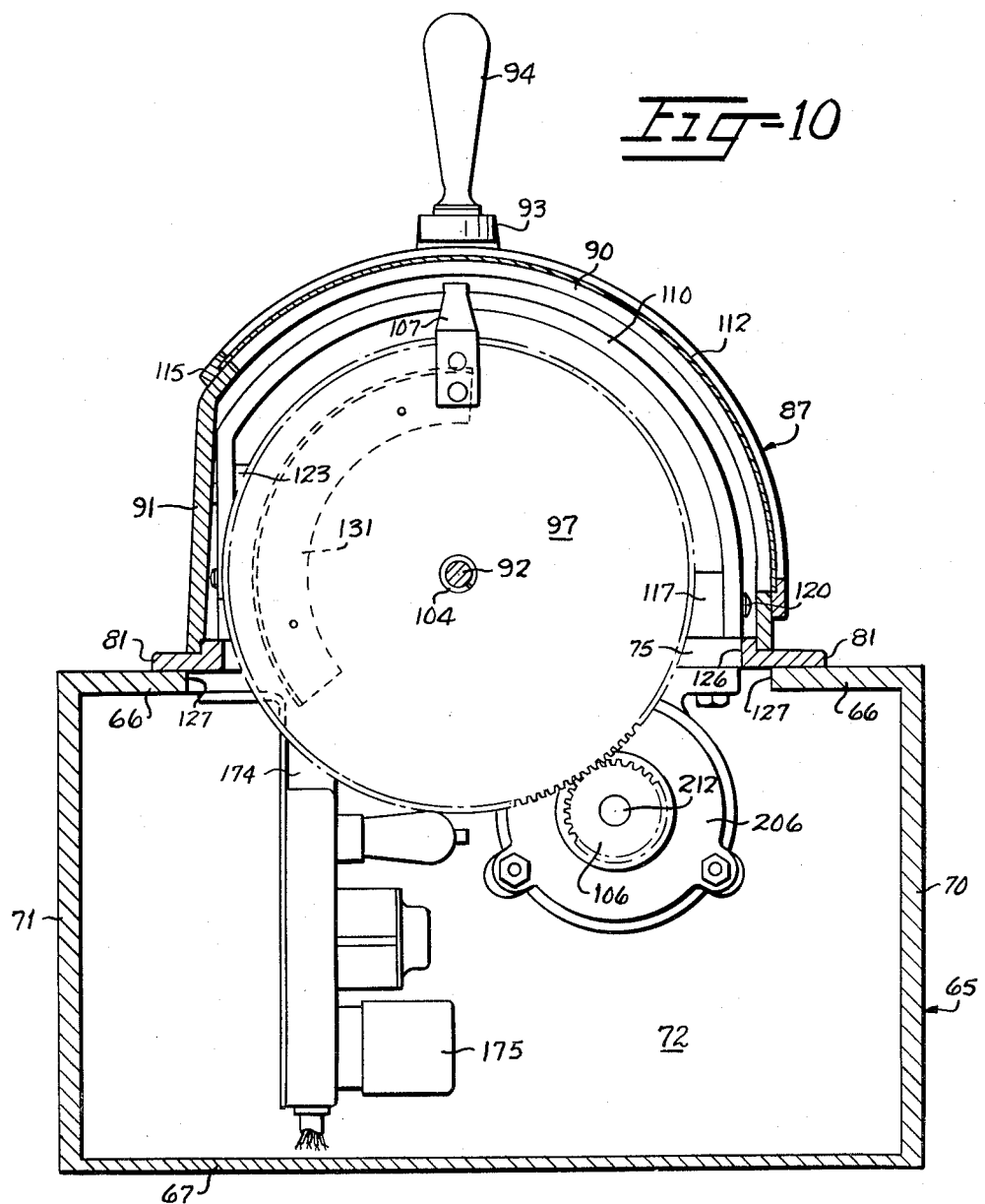

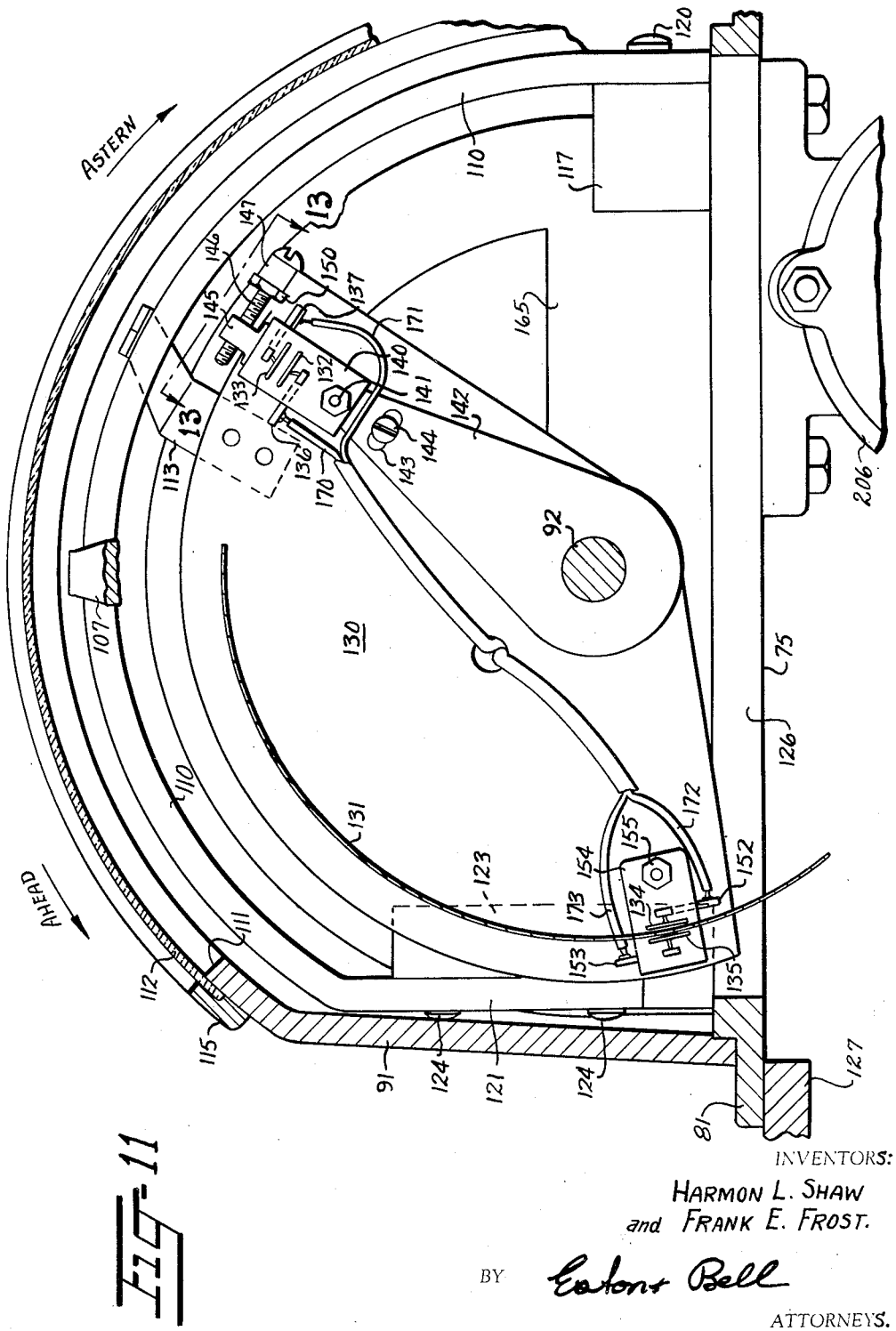

BY Eaton + Bell

ATTORNEYS.

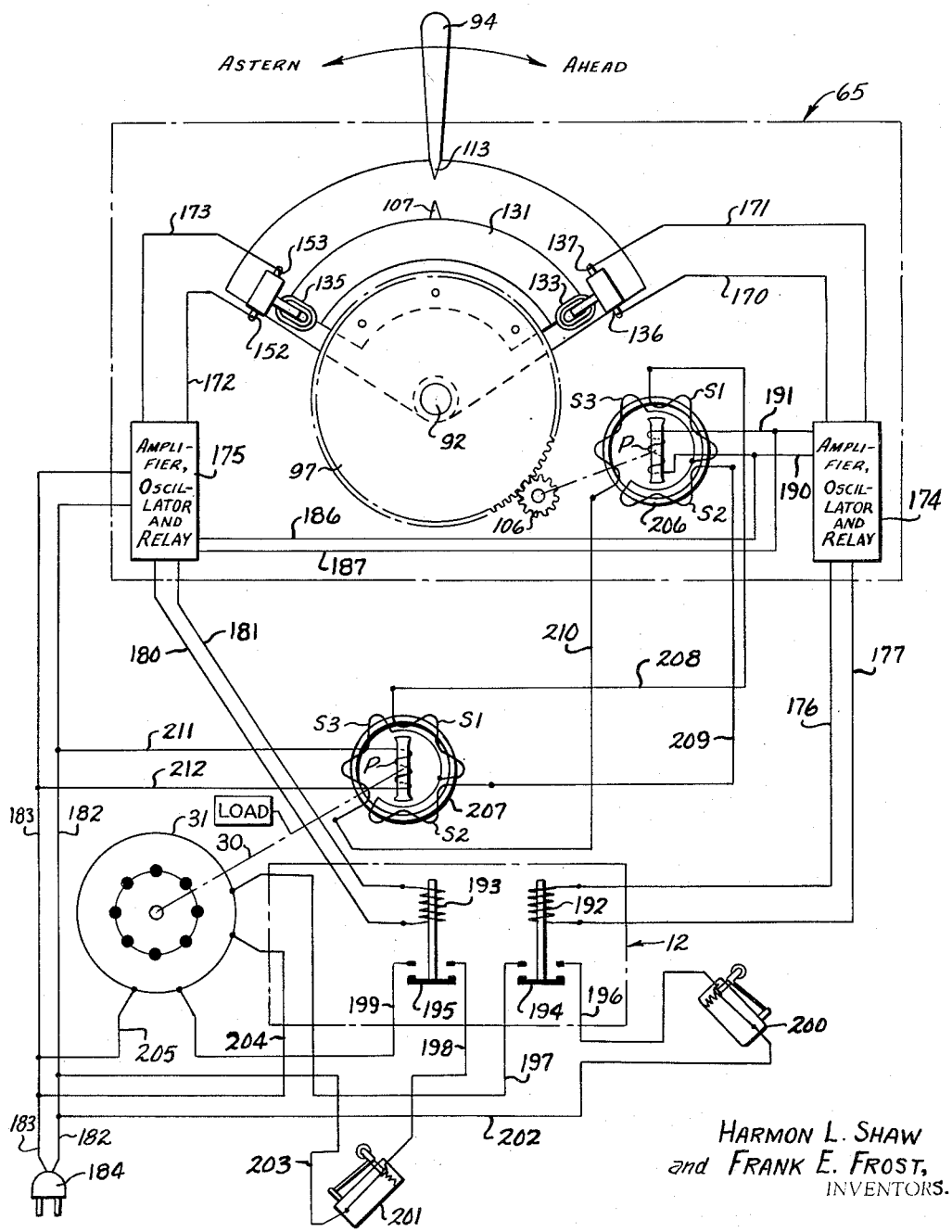

Aug. 21, 1956   H. L. SHAW ET AL   2,760,133
ELECTRICAL REMOTE CONTROL APPARATUS
Filed June 17, 1953   13 Sheets—Sheet 11
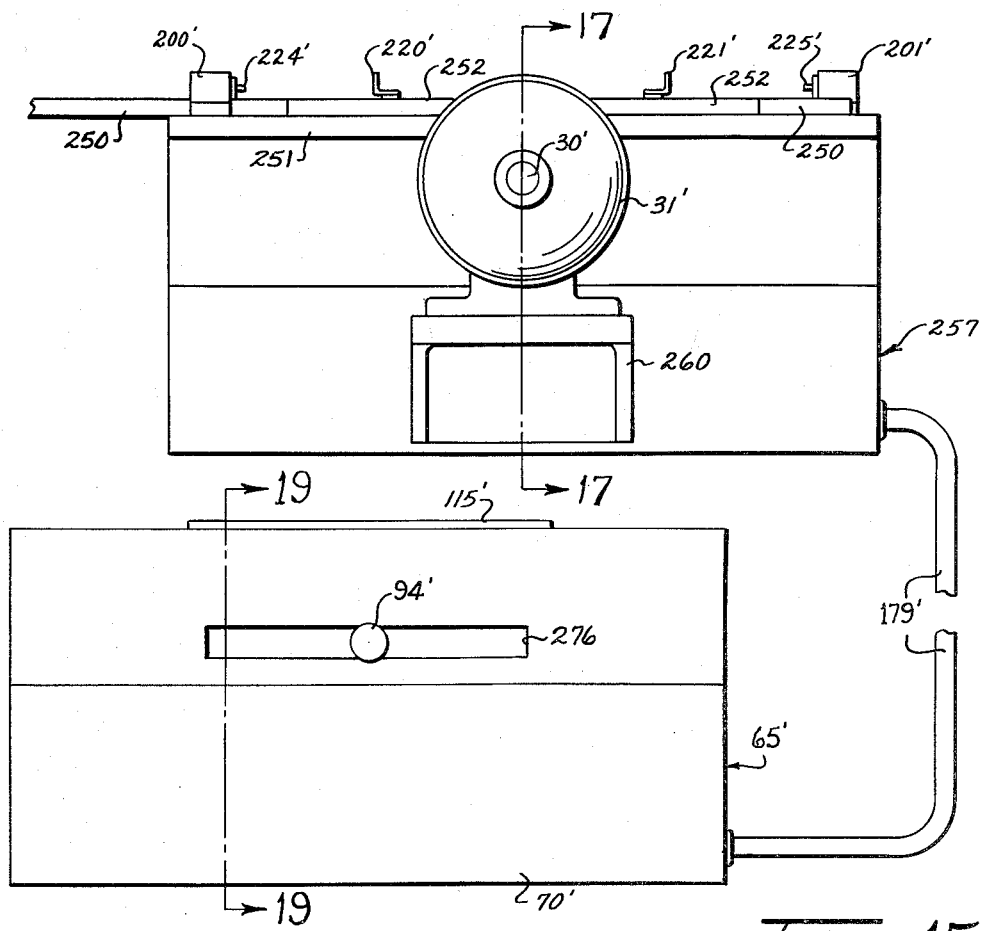
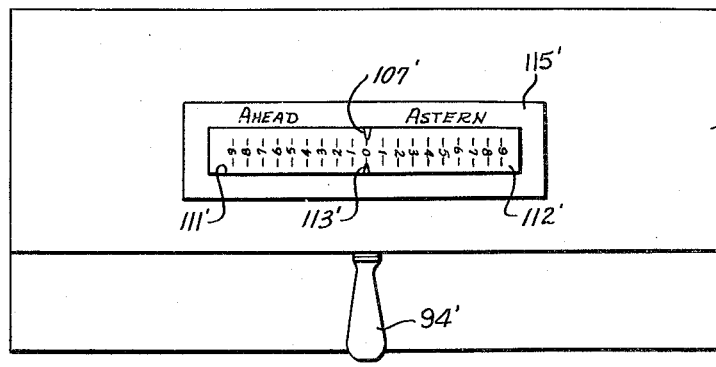
INVENTORS:
HARMON L. SHAW
and FRANK E. FROST.
BY Eaton + Bell
ATTORNEYS.

Aug. 21, 1956 H. L. SHAW ET AL 2,760,133
ELECTRICAL REMOTE CONTROL APPARATUS
Filed June 17, 1953 13 Sheets-Sheet 12
FIG-17
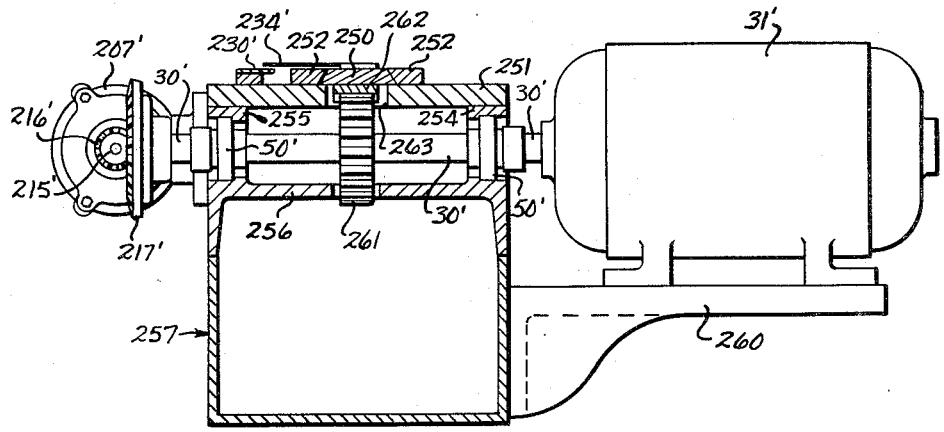
FIG-18
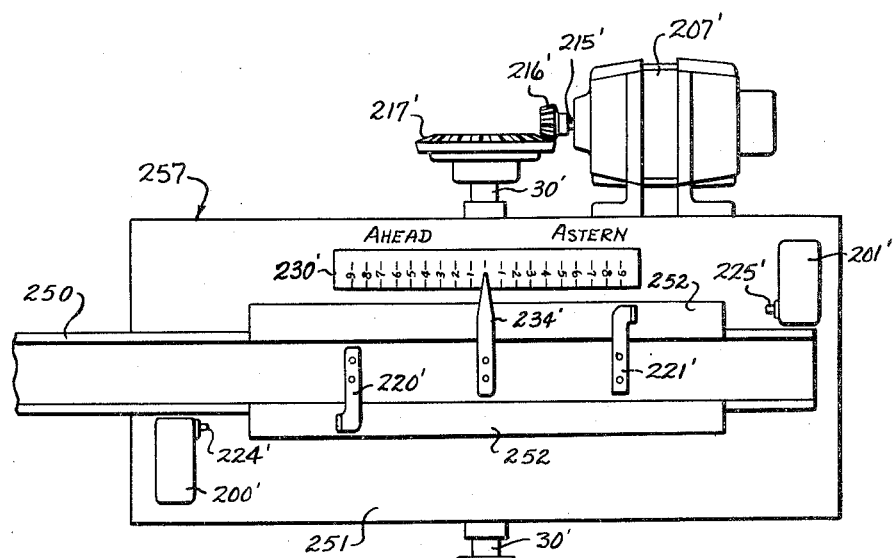
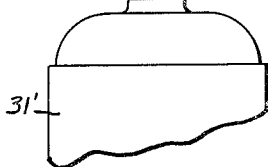
HARMON L. SHAW
and FRANK E. FROST,
INVENTORS.
BY Eaton & Bell
ATTORNEYS.

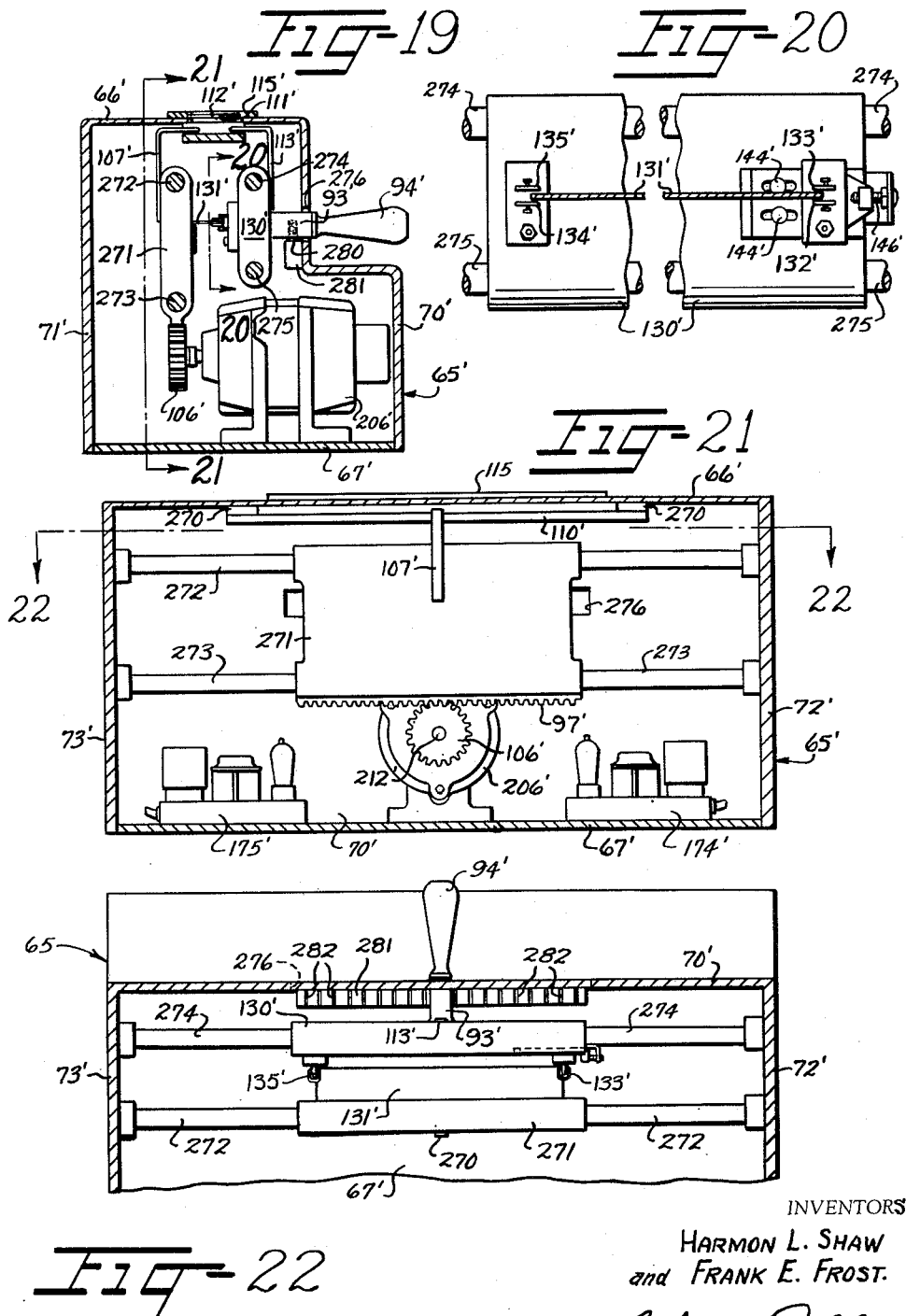

United States Patent Office 2,760,133
Patented Aug. 21, 1956

2,760,133

ELECTRICAL REMOTE CONTROL APPARATUS

Harmon L. Shaw and Frank E. Frost, Charlotte, N. C., assignors to Perfecting Service Company, Charlotte, N. C., a corporation of North Carolina Application June 17, 1953, Serial No. 362,272

5 Claims. (Cl. 318—31)

This invention generally relates to electric control devices and more especially to an improved apparatus for accurately remotely controlling the position, speed, torque or attitude of any movable element and, particularly, of a movable element requiring massive forces to control its position, speed, torque or attitude.

It is the primary object of this invention to provide a simple and effective means for accurately remotely controlling, by electric means, the position, speed, torque or attitude of any device and, particularly of any device whose resistance to being so controlled may be such as to be incapable of direct manual control to a minute degree of accuracy.

It is another object of this invention to provide a control apparatus of the character described for accurately controlling the position of a movable object comprising a reversible electric motor having a shaft which is controlled as to its direction of rotation by respective first and second magnetic switches or solenoid switches and wherein the shaft of the electric motor is mechanically connected to the object to be controlled thereby. An electrical circuit for controlling said switches includes respective first and second selsyns, the first of which is mechanically connected to a movable vane whose opposite end edges are movable between respective first and second sets of two oscillator coils carried by the manually movable control element.

The first and second sets of oscillator coils are connected to the respective first and second switches and respective first and second amplifiers are disposed in the electrical connections between the first and second sets of oscillator coils and the respective first and second magnetic switches.

Thus, upon manual movement of the manually movable control element, the first and second sets of oscillator coils are moved therewith so a substantial portion of the metallic vane is disposed between one of the first and second sets of oscillator coils only, thus completing a circuit to one of said switches. This excites the electric motor causing the shaft thereof to move in one direction. A driving connection is provided between the electric motor and the second selsyn so that the rotor thereof is rotated in corresponding relation to the shaft of the electric motor.

Now, as is well known to those familiar with the art, selsyns are similar to three-phase induction motors, but have two definite field poles, the windings of which are connected to a single-phase, alternating-circuit source of excitation. The first and second selsyns are electrically interconnected so that, upon rotation of the rotor of the second selsyn, which is then the transmitter rotor, like rotation is imparted to the rotor of the first selsyn, which is then the receiver selsyn. Thus, the receiving rotor of the first selsyn imparts movement to the metallic vane in a predetermined direction until the first and second sets of oscillator coils are again in balance. This causes the particular switch to again be opened to stop the flow of current to the electric motor.

Although electrical braking means or other braking means are provided for the electric motor, it is practically impossible to stop the electric motor immediately upon the flow of current thereto being broken. However, the continued rotation of the shaft or idling of the shaft will cause the metallic vane to continue its movement beyond balanced position relative to the first and second sets of oscillator coils, whereupon the other of the switches would then be closed to reverse the direction of rotation of the shaft of the electric motor and the reciprocal opening and closing of the first and second switches would continue until the shaft of the motor had ceased to override the braking of the flow of current to the motor thereby insuring that the movable object would be accurately positioned within minute tolerances in accordance with the predetermined position to which the movable control element was positioned by the operator.

It is evident that there are many fields in which the above described control apparatus may be used among which is means for controlling the pitch of a variable pitch propeller, an automatic pilot for aircraft or seacraft, depth control for submarines, altitude control for aircraft, control for fuel valves, control for rocket aircrafts, control for neutralizing rods in atomic piles, control for automatic transmissions, control for machinery as to speed, torque, etc., control of thickness of stock formed in rolling mills and the like, or for controlling the operation of any lever or rod for any purpose, etc.

Some of the objects of the invention having been stated, other objects will appear as the description proceeds, when taken in connection with the accompanying drawings in which—

Figure 1 is a somewhat schematic illustration of the improved apparatus wherein it is utilized for controlling the position of a shaft, such as may control the pitch of a variable speed propeller or the position of the rudder of a seacraft or aircraft or for any other similar purpose;

Figure 2 is a top plan view of the right-hand portion of the structure shown in the upper portion of Figure 1;

Figure 3 is a fragmentary elevation looking at the right-hand end of Figure 2;

Figure 4 is an enlarged elevation looking at the opposite side of the apparatus from that shown in the upper right-hand portion of Figure 1 with parts broken away and parts in section;

Figure 5 is a fragmentary vertical sectional view taken substantially along the line 5—5 in Figure 4, but showing the major portion of the selsyn in phantom or broken lines;

Figure 6 is an enlarged transverse vertical sectional view taken substantially along the line 6—6 in Figure 2;

Figure 7 is an enlarged fragmentary vertical sectional view taken substantially along the line 7—7 in Figure 2;

Figure 8 is an enlarged vertical sectional view through the manual control unit taken substantially along the line 8—8 in Figure 1, but showing the operating lever or handle in a different position for purposes of clarity;

Figure 9 is a top plan view of the manual control unit disassociated from the apparatus controlled thereby looking down substantially along the line 9—9 in Figure 8;

Figure 10 is a vertical sectional view taken substantially along the line 10—10 in Figure 8 showing the manually movable control element and the oscillator coil controlled elements in a neutral or balanced position;

Figure 11 is an enlarged fragmentary view taken substantially along the line 11—11 in Figure 8, but wherein the metallic vane is shown in unbalanced position relative to the sets of oscillator coils;

Figure 14 is a schematic diagram of the electrical circuit associated with the original or first form of the invention;

Figure 15 is an elevation of a second or modified form of the improved control system embodying the use of a straight metallic vane instead of an arcuate metallic vane as shown in the original or first form of the invention;

Figure 16 is a top plan view of the manual control unit of the second form of the invention disassociated from the apparatus controlled thereby;

Figure 17 is a vertical sectional view taken substantially along the line 17—17 in Figure 15 wherein the reversible electric motor is shown in elevation and illustrating how a rack and pinion arrangement may be utilized instead of the sprocket and chain arrangement illustrated in Figure 1, for accurately controlling the position of a movable object;

Figure 18 is a top plan view of the structure shown in the upper portion of Figure 15, but with a portion of the electric reversible motor broken away;

Figure 19 is a vertical sectional view through the modified or second form of the manual control unit taken substantially along the line 19—19 in Figure 15;

Figure 20 is a fragmentary longitudinal vertical sectional view of the manual control unit showing how the oscillator coils are mounted and being taken substantially along the line 20—20 in Figure 19;

Figure 21 is a longitudinal vertical sectional view through the modified or second form of manual control unit taken substantially along the line 21—21 in Figure 19;

Figure 22 is a fragmentary sectional plan view taken substantially along the line 22—22 in Figure 21.

Figure 13:
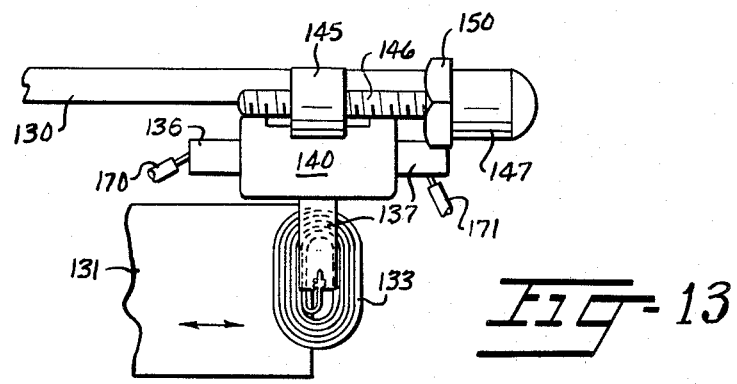
Figure 13 is an enlarged fragmentary detail looking substantially along the line 13—13 in Figure 11 and showing one form of means for adjusting the position of one of the sets of oscillator coils to thereby accurately adjust the spacing between the sets of oscillator coils.

Referring more specifically to the drawings, the first form of the invention is illustrated in Figures 1 to 14, inclusive, and wherein the principles of the present invention are embodied in an apparatus particularly designed for accurately controlling the position of a weighted shaft which shaft requires thousands of pounds of pressure in order to impart longitudinal movement thereto. As a typical application of the present invention, it is to be assumed that the first form of the invention is embodied in an apparatus for controlling the variable pitch or reversible pitch propeller of a sea-going ship and wherein the manual control unit may be mounted on the bridge of a ship and the shaft or movable object may represent a propeller pitch control shaft, which is driven to rotate the propeller or screw and is movable longitudinally to change the pitch of the propeller.

The movable object or shaft of the first or original form of the invention is indicated at 10 and is supported for longitudinal movement in a bearing stand 11 carried by a frame broadly designated at 12. The movable element 10 may be rotatable as well as being longitudinally movable in the bearing stand 11. One end of the shaft 10 is mounted in a block 13 having trunnions 14 on opposite sides thereof which are pivoted in first special links 15 interposed in a pair of endless belts or chains 16 and 17. In order to insure accuracy of the apparatus, it is preferable that the endless belts 16 and 17 be in the form of so-called "silent" chains. Now, in the event of the shaft 10 being movable longitudinally only, it is evident that the shaft may be fixed in the block 13. On the other hand, if the shaft 10 is also rotatable, then it may be rotatably mounted in the block 13 and suitably restrained from endwise movement relative to the block 13, as by collars or the like, not shown.

Since the movable object or element 10 exemplifies any object which may be relatively heavy and which requires considerable force to move the same in either direction, a weight or force transmitting element is shown schematically as a weight 20 connected to the left-hand end of the shaft or movable object 10 in Figure 1 by means of a cable, cord or flexible element 21, which passes upwardly from the weight 20 and over a pulley 22 suitably journaled on an arm 23 projecting outwardly and upwardly from a medial portion of the bearing stand 11. The elements 20 to 23, inclusive, are merely illustrated to indicate that considerable force is required to move the shaft or movable object 10 in either direction and is a schematic representation and is not to be construed as a limitation. As a matter of fact, in the event of the shaft 10 itself being relatively heavy, the frictional movement thereof through the bearing stand 11 could be such that the shaft 10 would be incapable of manual movement longitudinally thereof within minute limits. Such minute longitudinal adjustment is required in controlling the pitch of a reversible or variable pitch propeller of a sea-going ship, for example.

In order to impart longitudinal reciprocatory movement to the shaft or movable object 10, the endless belts or chains are mounted on respective pairs of pulleys or sprocket wheels 24, 25 and 26, 27. The sprocket chains or pulleys 24 and 26 are fixed on a common drive shaft 30 which is driven by a reversible electric motor 31 suitably supported by the frame 12.

The drive shaft 30 is journaled in bearing blocks 32 and 33 suitably secured to the bearing stand 11 and to a horizontally disposed frame member or channel bar 34 of the frame 12. The frame 12 also includes a base or platform 35 which may represent any convenient part of the ship adjacent the shaft 10, and the channel bar or plate or frame member 34 is supported in spaced relation above the platform 35 as by side panels 36 and 37 (Figures 1 and 4) and end panels 40 (Figure 3) and the proximal portion of the bearing stand 11.

The sprocket wheels or pulleys 25 and 27 are suitably journaled on respective bearing blocks 42 and 43 which are parts of a chain or endless belt take-up mechanism broadly designated at 44. In this instance, each of the bearing blocks 42 and 43 has a stub shaft or stud 45 fixed therein which has the inner race of an anti-friction or ball bearing 46 fixed thereon and on the outer race of which the corresponding sprocket wheel or pulley is fixedly mounted (Figure 6). It will also be observed in Figure 7 that the drive shaft 30 is preferably mounted in anti-friction bearings 50 carried by the bearing blocks 32 and 33.

It will be most clearly observed in Figures 5 and 6 that the bearing blocks 42 and 43 of the take-up 44 are mounted for longitudinal sliding movement on the upper surface of the plate 34 and are guided on respective dove tail guide members 52 and 53. The rear or outer ends of the bearing blocks or supports 42 and 43 are suitably secured to, or integral with, opposite ends of a transverse bar 54 which is slidably penetrated by a reduced portion 55 (Figure 2) of a take-up screw or threaded shaft 56. The threaded shaft 56 threadably penetrates a block or projection 57 suitably secured to, or integral with, the channel bar, frame member or plate 34 and which is spaced between the sprocket wheels or pulleys 25, 27. The outer end of the reduced portion 55 of the threaded shaft or screw 56 is provided with a screw driver slot 60 to facilitate turning the screw 56 in either direction to thereby increase or decrease the amount of tension in the endless belts or sprocket chains 16 and 17.

It is thus seen, that rotation of the shaft 30 in either direction, as effected by the electric motor 31, will impart longitudinal movement to the movable object or shaft 10 in the corresponding direction. Now, it is not unusual to control the position of a shaft or other movable element by means of a reversible motor, but to our knowledge, no effective means has heretofore been provided which would accurately control the position to which the movable object or shaft 10 could be moved by the electric motor or any other means, particularly by remote control, so that the movable object or shaft would be moved to any number of predetermined positions within a minute degree of accuracy of, say, ten-thousandths of an inch and then held in said position. Therefore, we have provided an improved means to accurately control the flow of electrical energy to the reversible electric motor 31 so as to cause the shaft 30 driven by the electric motor to come to rest at any predetermined position with resultant accurate positioning of the movable object or shaft 10 relative to a predetermined point. Of course, in order to multiply the efficiency of the present invention, it is preferable that the motor 31 be of the gear reduction type so the rotor of the motor rotates at a substantially greater speed than that of the shaft 30 driven thereby. Also, it is preferable that a suitable braking means, such as an electric brake, be provided in association with the electric motor 31 in order to assist in stopping the motor 31 upon stopping the flow of current thereto.

In the first form of the invention, a manual or remote control unit is illustrated in the lower portion of Figure 1 and, Figures 8 to 13, inclusive, and in the upper portion of Figure 14 and which includes a box-like frame or housing broadly designated at 65. Although the frame 65 may be constructed in any desired manner, as illustrated, it includes top and bottom walls 66 and 67, end walls 70 and 71 and side walls 72 and 73 which are suitably interconnected to form a box-like structure. The top wall 66 supports a substantially rectangular base 75 (Figure 8) which is provided with upwardly projecting relatively short base side walls 76 and 77, opposite ends of which are connected to, or cast integral with, side flange or projections 80 and end flanges 81 (Figures 1, 8 and 10). The proximal upper edges of the projections 76 and 77 are provided with shoulders 83 therein in which tongue or tongue portions or projections 84 of respective side walls 85 and 86 of a removable cover broadly designated at 87 are adapted to fit. The cover 87 also includes an arcuate upper wall 90 and a substantially vertical wall 91 whose lower edges fit against the distal surfaces of the flange 81 on the base 75.

The short wall 76 projecting upwardly from base 75 rotatably supports a pivot shaft 92, one end of which penetrates the wall 76 and has a hand lever 93 fixed thereon which extends upwardly and then curves inwardly and has a suitable handle 94 fixed to the upper or outer end thereof. The end of the shaft 92 remote from the hand lever 93 has a reduced portion 96 thereon which is rotatably mounted in the short wall 77 of the base 75 and on which a relatively large gear 97 is rotatably mounted. In this instance, the hub of the gear 97 has a bore 100 therein which is provided with a peripheral groove 102 in which the outer races of anti-friction bearings 103 are mounted. The inner races of the anti-friction bearings 103 are preferably slidable on the reduced portion 96 of the shaft 92 and the inner race of the outermost of said anti-friction bearings is engaged by one end of a compression spring 104 whose other end engages a washer 105 mounted on the reduced portion 96 of the shaft 92 and bearing against the inner surface of the wall 77. Although the gear 97 may be in rotatable and frictional engagement with the reduced portion 96 of shaft 92, the particular manner in which it is mounted facilitates moving the gear 97 outwardly toward the wall 77 on the shaft 92 for adjusting the position of the gear 97 relative to a pinion or relatively small gear 106 which is normally engaged thereby. The purpose of the gear 106 will be later described.

The gear 97 has an indicating pointer 107 suitably secured thereto which, in Figure 8, projects upwardly and inwardly at an angle and then inwardly in substantially parallel relation to the axis of the shaft 92 and a portion thereof overlies an arcuate indicator plate 110 whose upper or outer surface is suitably graduated as shown in Figure 9. The arcuate wall 90 of the cover 87 has a sight slot 111 therein which is preferably covered with a transparent arcuate plate 112 so the operator may view the relative positions of the automatically driven indicating pointer 107 and a manually operated indicating or order pointer 113 relative to the graduations on the outer surface of the gauge member or indicator plate 110. The transparent window or plate 112 may be held in position over the opening 111 in any desired manner and is shown as being mounted in a frame 115 suitably secured to the outer surface of the arcuate wall 90 of the cover 87.

Figure 12:
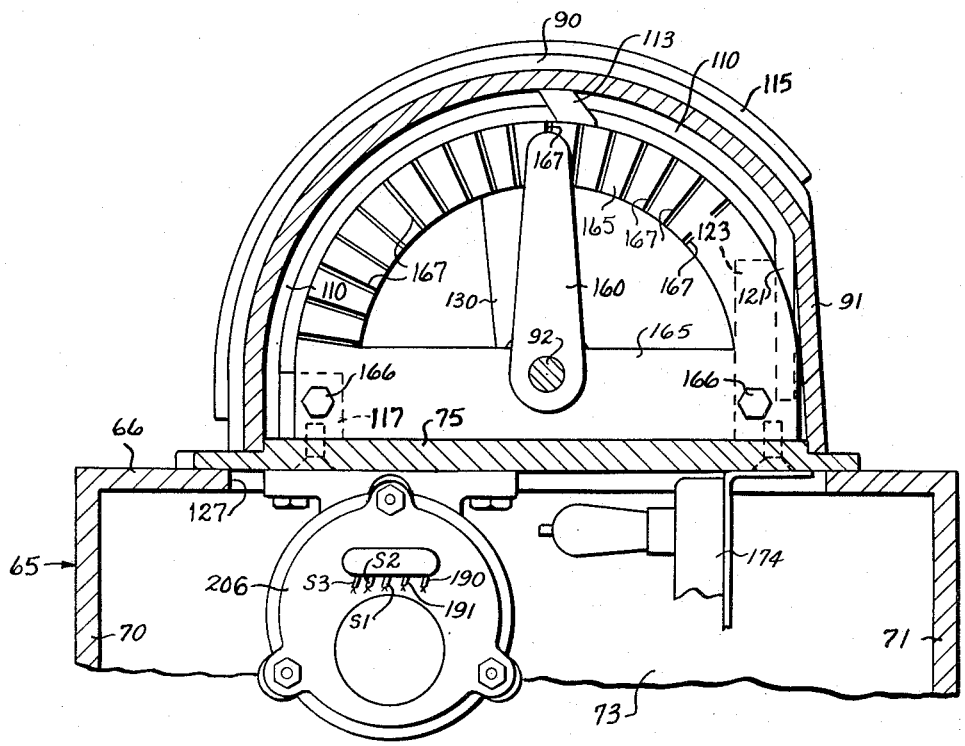
Figure 12 is a vertical sectional view taken substantially along the line 12—12 in Figure 8.

One end of the graduated arcuate gauge member 110 is suitably secured to a block 117, as by screws 120, which block is suitably secured to the upper surface of the base 75. The other end of the arcuate gauge member 110 has a substantially vertical portion 121 integral therewith which is suitably secured to a block 123, as by screws 124. The lower end of the block 123 is also suitably secured to the base 75 (Figures 11 and 12). The base 75 is provided with an elongated slot 126 through which the lower portion of the relatively large gear 97 freely extends and the top wall 66 of the housing 65 is also provided with an opening 127 through which the gear 97 extends.

It will be best observed in Figures 8 and 11 that the free end of the manually movable indicating pointer 113 also overlies the outer surface of the arcuate gauge member 110 adjacent the opposite side edge thereof from that adjacent which the indicating pointer 107 is disposed. The pointer 113 then extends outwardly and passes radially inwardly and then curves inwardly in substantially parallel relation to the inner surface of the arcuate gauge member 110 and is suitably secured to a segmental oscillator coil carrying plate 130 which is fixed on the medial portion of the shaft 92 adjacent the gear 97. The segmental plate 130 carries two sets of two oscillator coils 132, 133 and 134, 135, between which an arcuate metallic vane 131 is adapted to pass.

The arcuate metallic vane 131 is suitably adjustably secured to the inner surface of the gear 97. The first pair of oscillator coils 132, 133 are disposed adjacent one of the radial edges of the segmental plate 130 and the second pair of oscillator coils 134, 135 are disposed closely adjacent the other radial plane of the segmental plate 130. The "point of excitation" of each set of coils 132, 133 and 134, 135 is substantially at the center thereof and it will be observed that the length of the vane is slightly less than the distance between the center point of the oscillator coils 132 and 133 and the center point of the oscillator coils 134 and 135. Thus when the vane 131 is balanced relative to both sets of coils, oscillation will be permitted between the coils of each set, that is, current may flow therebetween. Thus, minute relative movement between the sets of oscillator coils and said vane 131 permits current to flow between that pair or set of coils whose point of excitation is not interrupted by the vane. Said oscillator coils may also be termed as circuit closing elements and said vane may also be termed as a circuit breaking element.

The first set of oscillator coils 132, 133 are suitably secured to respective terminals or contacts 136 and 137 embedded in an insulation block 140. The insulation block 140 is preferably made from a plastic material molded around the contacts 136 and 137. The insulation block 140 is suitably secured, as by a bolt 141, adjacent the outer end of an arm 142 which extends inwardly and is oscillatably mounted on the shaft 92. The arm 142 has a transverse slot 143 therein which is slidably penetrated by a screw 144 threadably embedded in the plate 130 for adjustably securing the arm 142 to the outer surface of the segmental plate 130. In order to facilitate minute adjustment of the oscillator coils 132 and 133 relative to the second set of oscillator coils 134 and 135 and the arcuate metallic vane 131 the free or outer end of the arm 142 may have an internally threaded projection 145 thereon which is threadably penetrated by an adjustment screw 146, the head of which bears against the outer surface of a projection 147 on the adjacent portion of the segmental plate 130 and which projection 147 is slidably penetrated by the adjustment screw 146. The adjustment screw 146 also has a lock nut 150 thereon to maintain the same in adjusted position (Figures 8, 11, 12 and 14).

The second pair of oscillator coils 134 and 135 are also suitably secured in closely spaced relation to each other to respective substantially L-shaped contacts 152 and 153 carried by an insulation block 154. The insulation block 154 is preferably molded around the contacts 152 and 153 and is suitably secured to the segmental plate 130, as by a bolt 155. It is thus seen that movement of the hand lever 93 in either direction will cause like movement to be imparted to the segmental plate 130, the indicating pointer 113 and the two sets or pairs of oscillator coils 132, 133 and 134, 135. The two sets of oscillator coils are so spaced that, when the metallic vane 131 is in a neutral or balanced position relative to the two sets of oscillator coils, opposite ends of the vane are disposed between the respective sets of oscillator coils but are short of the axes or center points of the corresponding set of oscillator coils and thereby permit current to flow between the adjacent oscillator coils. Of course, upon the hand lever 93 being moved to thereby move the oscillator coils 132, 133 and 134, 135 relative to the vane 131, substantially as shown in Figure 11, the vane will then be positioned between the set of oscillator coils 134 and 135 and will not be positioned between the other of the set of oscillator coils 132 and 133 and will thereby cause current to flow between the coils 132 and 133. The electrical circuit controlled by the vane 131 in the two sets of oscillator coils will be later described.

Now, when the operating or hand lever 93 and handle 94 are in the upright or centermost position, as shown in Figures 8, 9 and 10, the indicating pointer 113 points to the numeral 3 on the graduated face of the arcuate gauge plate 110, in which instance, the shaft or movable object 10 is caused to occupy a corresponding position by means to be presently described. Now, in order to assist in maintaining the operating lever or hand lever 93 and handle 94 in any desired adjusted position, it will be observed in Figures 8 and 12 that the medial portion of the shaft 92 has an indexing bar 160 fixed thereon and projecting radially therefrom in substantially parallel relation to the operating lever or hand lever 93. The free end portion of the indexing bar 160 has a suitable spring-pressed detent mounted therein which is shown in the form of a ball 161 which is slidably mounted in a bore or cavity 162 provided therefor in the arm or indexing bar 160 and which bore or cavity 162 has a compression spring 163 therein for urging the ball 161 into engagement with an arcuate indexing plate 165.

The indexing plate 165 is substantially semicircular and is suitably secured, as by screws 166 (Figure 12) to the blocks 117 and 123. The shaft 92 is also rotatable in the lower portion of the indexing plate 165. The indexing plate is provided with a plurality of spaced radially extending grooves 167 in the outer surface thereof, there being one of these grooves 167 coinciding with each of the graduations on the graduated indicator plate 110.

Thus, the operating lever or handle 93 may be rotated so the pointer 113 registers with any one of the graduations on the gauge plate 110 and the ball or detent 161 will seat in the corresponding indexing groove 167 in the indexing plate 165 and will thereby assist in maintaining the operating lever or hand lever 93 in the desired position.

Now, in order to energize the corresponding coil of the reversible electric motor 31 to cause the drive shaft 30 to rotate in the desired direction when the indicating pointer 113 is moved manually relative to the indicating pointer 107 in either direction in Figure 9, the oscillator coil contacts 136, 137, 152, 153 have corresponding ends of respective wires or conductors 170 to 173, inclusive, connected thereto, and the wires 170, 171 extend to a suitable amplifier 174 and the wires 172, 173 extend to a similar amplifier 175. The amplifiers 174, 175 may be of any desired construction and are provided with respective oscillators and relays, not shown. When the vane 131 is not disposed between either of the sets of oscillator coils 132, 133 or 134, 135, the oscillators cause the respective amplifiers 174, 175 to produce a normal current which functions to open their respective relays. When the current of the oscillator 174 is decreased due to the vane 131 being disposed between the centerpoint of the coils 132 and 133, the relay of the amplifier 174 closes and current flows through a pair of wires or conductors 176, 177. Also, when the current of the amplifier 175 is decreased by the vane 131 being disposed between the centerpoint of the other coils 134 and 135, the relay in amplifier 175 is closed and current flows through a pair of wires 180 and 181.

The current is introduced to a transformer, not shown, of the amplifier 175 through a pair of lead wires or conductors 182, 183 connected to opposite sides of a suitable plug 184 adapted to be connected to a suitable source of electrical energy, not shown.

The amplifier 175 has wires or conductors 186, 187 (Figure 14) extending from the opposite side thereof from that to which the wires 182, 183 are connected and these wires 186, 187 are connected to the medial portions of respective wires 190, 191, corresponding ends of which are connected to a transformer, not shown, of the amplifier 174 to thereby direct current thereto.

The amplifiers and their oscillators and relays may be of any desired construction such as the type illustrated in a catalogue No. 8,000 published by Minneapolis-Honeywell Regulator Company, Industrial Division, Philadelphia 44, Pennsylvania, and entitled Vane Type Electric Contact Controllers. A detailed illustration and description of the amplifiers 174 and 175 and the associated relays is thus deemed unnecessary.

Upon excitation of the amplifiers 174, 175, the current flows through the respective wires 176, 177 and 180, 181 to respective coils 192, 193 which are parts of magnetic or solenoid relays or relay switches indicated at 194, 195, respectively. For purposes of description, the relay switch 194 may be termed as a forward or ahead relay and the relay switch 195 may be termed as a rearward or astern relay. When closed, the relay switch 194 causes current to flow between wires or conductors 196, 197. When the reverse or rearward relay switch 195 is closed, current flows between wires 198, 199.

The wires 176, 177, 180, 181 extend from the respective amplifiers 174, 175 and pass through a suitable opening provided therefor in the wall 72 of the frame 65 and, thence, through a suitable conduit or cable 179 which extends to and is connected to the wall 36 of the frame 12. The wires 176, 177, 180, 181 then extend through a suitable opening provided therefor in the wall 36 and are connected to the respective coils 192, 193 of the respective relay switches 194, 195.

Now, referring to Figure 4, it will be observed that the relay switches 194 and 195 are suitably supported on a substantially inverted L-shaped bracket or angle plate 195a depending from the lower surface of the channel bar or plate 34 of the frame 12. The wires or conductors 196, 198 lead from the respective relay switches 194, 195 through the wall 37 of frame 12 and are connected to corresponding ends of respective normally closed sensitive switches 200, 201.

The other side or ends of the switches 200, 201 have respective wires or conductors 202, 203 connected thereto which lead to the lead wire 182. The wires 197, 199 also extend from the relay switches 194, 195 outwardly through the wall 36 of the frame 12 and are connected to respective first and second field coils or armature coils, not shown, of the reversible electric motor. The other side of the respective first and second field coils of the motor 31 have corresponding ends of wires 204, 205 connected thereto, whose other ends are connected to the lead wire 183.

It is thus seen that, upon movement of the handle 94 to the right or ahead position in Figure 14, the segmental plate 130 carrying the oscillator coils will move to position the coils 134 and 135 on opposite sides of the vane 131 to break the circuit therebetween, the circuit between the coils 132 and 133 remaining open. The solenoid or magnetic relay switch 195 will then be closed to energize the first field coil or armature coil of the electric motor 31 and to thereby cause the movable object or shaft 10 to move from right to left in Figures 1 and 2. Of course, upon subsequent movement of the vane 131 from left to right in Figure 14, to where the end of the vane 131 clears the center point between the oscillator coils 134, 135, oscillation of said oscillator coils is started to thereby open the relay switch 195.

In the event the opposite end of the vane 131 is moved beyond the center point of the oscillator coils 132, 133, the relay in the amplifier 174 will be closed to close the relay switch 194 and to thereby energize the second field coil or armature coil of the electric motor 31 and to cause the movable object or shaft 10 to move in the opposite direction or from left to right in Figures 1 and 2.

In order to synchronize the movement of the vane 131 with the movement of the shaft or movable object 10, first and second selsyns 206 and 207 are provided. In this instance, the first selsyn 206 may be termed as a receiver selsyn and the second selsyn 207 may be termed as a transmitter selsyn. The selsyns 206 and 207 may be of the high accuracy, high torque type such as is manufactured by General Electric Company, Schenectady, New York, under their model No. 2J65SB1 and which is clearly described in their Catalogue No. GTA–2176C.

As is well known to those familiar with the art, selsyns are similar to three phase induction motors, but have two definite field poles, the windings of which are connected to a single phase, alternating current source of excitation. In this instance, a simple selsyn system is used wherein each of the two selsyns 206, 207 has three secondary windings S–1, S–2, S–3. The secondary windings S–1, S–2, S–3 of the transmitter selsyn 207 are electrically connected to the respective windings S–1, S–2, S–3 of the receiver selsyn 206 by means of respective wires or conductors 208, 209, 210. Each of the selsyns 206, 207 also has a primary or rotor winding P and the ends of the wires 190, 191 remote from amplifier 174 are connected to opposite ends of the primary winding P of the receiver selsyn 206. The opposite ends of the primary winding P of selsyn 207 are connected to corresponding ends of wires or conductors 211 and 212 whose other ends are connected to respective wires 182, 183.

Now, referring to Figure 12, it will be observed that the first or receiver selsyn 206 is suitably secured to the lower surface of the platform 75 and depends through the opening 127 in the top wall 66 of the frame or housing 65. The shaft of the selsyn 206 is indicated at 212 and the pinion 106 is fixed on said shaft 212 (Figure 10). The selsyn 207 is suitably secured to a plate or block 214 (Figures 2 to 5, inclusive) suitably secured to, and extending upwardly from, the frame member 34 of the frame 12. The selsyn 207 has a shaft 215 extending therefrom which is geared to the drive shaft 30 by means of a relatively small beveled gear 216 fixed on the shaft 215 which meshes with a relatively large beveled gear 217 on a hub 218 fixed on the outer end of the shaft 30 remote from the reversible motor 31.

The beveled gear 217 is adjustably secured to the hub 218 by screws 222 which slidably penetrate respective arcuate slots 223 provided in the gear 217 and are threadably embedded in the hub 218. The hub 218 of the beveled gear 217 has a pair of segmental cams 220 and 221 adjustably mounted thereon, as by set screws 220a (Figure 7). The cams 220, 221 are adapted to, at times, engage respective switch operating plungers or followers 224, 225 for opening the respective switches 200, 201. It will be observed in Figures 2, 4 and 7 that the switches 200, 201 or the housings thereof, are mounted on respective brackets 226, 227 whose lower portions are suitably secured to the frame member 34 and whose upper portions are suitably secured to the bearing block 33 and the uprising frame member or block 214, respectively. The purpose of the switches 200, 201 will be later described.

Referring to Figures 2 and 4, the upper surface of the uprising frame member or block 214 supports a graduated position indicating plate 230 which is preferably graduated in accordance with the graduations on the outer face of the arcuate gauge plate 110 (Figure 9). For purposes of clarity and, since the present apparatus is herein described as though associated with a shaft for controlling the pitch of a variable pitch propeller of a ship or the like, the words "ahead" and "astern" are formed on the indicator plate 230 and the arcuate gauge plate 110 adjacent opposite sides of the zero graduations. It is evident that various calibrations or adjustments would be required to insure that the shaft or movable object is accurately located relative to the graduated plate 230 when the propeller is in a neutral position. Therefore, the graduated plate 230 is preferably adjustably mounted on the uprising block or frame member 214 by means of screws 231 which penetrate longitudinally extending slots 233 provided in the plate 230. The special link 15 of the endless belt 17 has a suitable position pointer 234 suitably secured to an upstanding portion 15a which overlies the indicator plate 230 and which is alined with the zero graduation on the plate 230 when the shaft or movable object 10 is in a neutral position.

*Method of operation*

Assuming the pointer 234 (Figure 2) to be properly positioned at the zero graduation on the plate 230 and the shaft or movable object 10 to be in a neutral position, and also assuming that the secondary windings S–1, S–2, S–3 of the selsyns 206 and 207 are balanced, the gear 97 is adjusted relative to the pinion 106 so that both the order pointer 113 and the position pointer 107 register with the zero graduation on the arcuate plate 110. In this position, the opposite ends of the vane 131 are disposed between the first and second sets of oscillator coils 132, 133 and 134, 135 but clear of the center points of said coils, thereby preventing the relays in the amplifiers 174 and 175 from closing so relays 194, 195 are open. The gear 97 is adjusted relative to the pinion 106 by moving the gear 97 outwardly or from right to left in Figure 8 against the spring 104 and then rotating the same to the desired position free of the gear 106. Upon releasing the gear 97, the spring 104 moves the same inwardly to the position shown in Figure 8 and whereupon the gear 97 engages the gear or pinion 106. Of course, any further minute adjustment may be made by varying the position of the oscillator coils 132, 133 by means of the adjustment screw 146 (Figures 12 and 13).

Assuming that the operator desires to move the shaft or movable object 10 from right to left in Figures 1 and 2, a predetermined distance as indicated by the graduation 3 "ahead," for example, the handle 94 is moved forwardly or in a clockwise direction in Figure 14 so that it occupies the position shown in Figures 8, 9 and 10. Of course, this moves the order pointer 113 away from the position pointer 107 and, in so doing, the set of oscillator coils 134, 135 moves away from the metallic vane 131 and the oscillator coils 132, 133 move astride the metallic vane 131.

As heretofore stated, when the vane 131 is disposed between the coils 132, 133, the oscillation between such coils ceases, breaking the circuit to the relay of the amplifier 174 causing it to close which, in turn, closes the relay switch 194 to energize the corresponding field of the electric motor 31 which will then impart rotation to the drive shaft 30 to drive the endless belts or sprocket chains 16 and 17 in a counter-clockwise direction in Figure 1 or to move the upper reaches thereof from right to left in Figure 2.

As the upper reaches of the endless belts or sprocket chains 16 and 17 move from right to left in Figure 2, like movement is imparted to the movable object or propeller control shaft 10 and the pointer 234. Of course, the shaft 30 then imparts rotation to the rotor of the second or transmitter selsyn 207 in one direction through the intervening gears 216, 217 and shaft 215 which throws the secondary coils S–1, S–2, S–3 of the selsyns 206 and 207 out of balance which causes the shaft 212 of the first or receiver selsyn 206 to rotate at the same speed and in the same direction as the shaft 215 of the second or transmitter selsyn 207 until the rotors of the two selsyns 206 and 207 are in exactly corresponding positions. In this instance, the rotors of the two selsyns 206 and 207 will not occupy corresponding positions until the pointer 234 (Figure 2) has moved into alinement with the graduation 3 "ahead" on the plate 230, at which time the position pointer 107 in the manual control unit will have moved to position in alinement with the graduation 3 "ahead" on the arcuate indicating gauge 110.

Movement of the position indicating pointer 107 into alinement with the order pointer 113 causes the metallic vane 131 to again occupy a balanced position. Of course, this permits further oscillation of the oscillator coils 132, 133 to thereby open the relay switch 194.

It might be stated that the reason for the self-synchronous action of the selsyns 206, 207 is that because the single phase current in the primary windings P of selsyns 206, 207 induce voltages in the three primary windings S–1, S–2, S–3 of the corresponding selsyns 206, 207. These three voltages are not equal in magnitude and vary with the position of the rotors. When the rotors of the two selsyns 206, 207 are in exactly corresponding positions, the voltages induced in the secondary coils of the transmitter selsyn 207 are equal and opposite to those induced in the secondary windings of the receiver selsyn 206; that is, they are balanced, therefore, no current flows in the secondary winding. If, on the other hand, the rotor of the transmitter selsyn 207 is moved from the original position in the manner heretofore described, the induced voltages are no longer equal and opposite, and current flows in the secondary windings of both the selsyns 206 and 207. This current flow sets up a torque which tends to return the rotors of the two selsyns to the synchronous position. This position corresponds to the new position of the rotor of the second or transmitter selsyn 207.

Now, as heretofore stated, the motor 31 is preferably provided with a suitable braking means, such as a magnetic brake, which causes the shaft 30 to cease rotation almost immediately upon stopping the flow of electrical energy to the electric motor 31. However, due to the minute accuracy required, it is practically impossible to stop the motor 30 before the pointer 234 (Figure 2) has moved beyond the predetermined graduation on the indicator plate 230, which is the graduation 3 "ahead" in this instance, although the flow of electrical energy to the electric motor 31 is stopped immediately upon the pointer 234 reaching said predetermined position.

However, this overrunning of the electric motor 31 is counter-acted, since the rotors of the selsyns 206 and 207 continue to move in synchronism with the result that the vane 131 moves between the said second set of oscillator coils 134, 135, closing the relay switch 195 and reversing the directing rotation of the shaft 30 to thereby cause the pointer 234 (Figure 2) to move toward "astern" or from left to right in Figure 2. Thus, the pointer 234 oscillates wherein each stroke of oscillation gradually diminishes until the pointer 234 is perfectly alined with the predetermined graduation on the plate 230.

It is evident that, when the order pointer 113 is again moved toward "astern" to occupy, say, the position in alinement with the zero graduation on the graduated arcuate gauge plate 110, the vane 131 is moved between the second set of oscillator coils 134, 135 whereupon the motor 31 causes the shaft 30 to rotate in the opposite direction from that heretofore described and the selsyns 206 and 207 operate in the opposite manner from that heretofore described to cause the position indicating pointer 107 to again move into alinement with the order pointer 113 as the indicating pointer 234 moves into alinement with the corresponding graduation on the plate 230.

If, for any reason, such as malfunction of the amplifiers 174, 175 or the relay switches 194, 195 or the selsyns 206 and 207, the flow of electrical energy to the electric motor 31 is not stopped at the predetermined time in accordance with the position of the order pointer 113, and the pointer 234 moves beyond the limits of the graduations of the plate 230, the corresponding cam 220 or 221 engages the plunger or follower of the corresponding safety switch 200, 201, depending upon the direction of movement of the pointer 234 to thus open the particular switch 200 or 201 corresponding to the relay switch 194 or 195 which may be closed at that time. This stops the motor 31 before the pointer 234 has moved sufficiently to damage the same or before any parts which may be connected to the shaft or movable object 10 are damaged.

In order to insure that the block 13 to which the shaft 10 is connected moves in a straight line in alinement with the movable object or shaft 10, it will be observed in Figures 1, 3, 5 and 7 that the block 13 is suitably secured to a guide bar 240, which depends from the block 13 and is mounted for sliding movement upon the frame member 34 and is guided between ways or ribs 241 suitably secured to the upper surface of the frame member or channel bar 34 and extending in parallel relation to the endless belts or chains 16 and 17.

*Modified or second form of the invention*

There are many different ways in which the principles of the present invention may be applied and the second or modified form of the invention shown in Figures 15 to 22, inclusive, is particularly disclosed hereinafter to illustrate the use of a planar or flat gauge plate and associated vanes in the manual control unit and a different means for imparting movement to the loaded movable object from that disclosed in the first form of the invention shown in Figures 1 to 14, inclusive.

In the second or modified form of the invention, the weighted or heavy movable object is indicated at 250 and is shown in the form of a dovetailed bar which may be used for positioning any desired type of device in the same manner as that described for the movable object 10 in the first or original form of the invention. The dovetailed bar 250 is mounted for sliding movement on a plate 251 and is guided between a pair of ribs or ways 252 suitably secured to the upper surface of the plate 251. The plate 251 is suitably secured to a pair of elongated uprising standards or side frame members 254 and 255 integral with, or suitably secured to, a horizontally disposed frame member or channel bar 256 which is a part of a frame broadly designated at 257. The frame 257 is shown as being of generally box-like construction and supports a motor platform 260 to which an electric motor 31' is suitably secured. The electric motor 31' is preferably a gear reduction motor provided with a suitable braking means, since it serves substantially the same purposes as the electric motor 31 in Figures 1, 2 and 3. The electric motor 31' drives a shaft 30' suitably journaled in the side frame members 254 and 255, as by anti-friction bearings 50'. The end of the shaft 30' remote from the reversible electric motor 31' has a bevel gear 217' fixed thereon which matches with a relatively smaller bevel gear 216' fixed on a shaft 215' of a transmitter selsyn 207'. The transmitter selsyn 207' is suitably secured to the outer surface of the side frame member 255 of the frame 257. The selsyn 207' serves the same purpose as the selsyn 207 in the original form of the invention.

The shaft 30' has a gear 261 fixed intermediate the ends thereof which meshes with a rack 262 depending from the lower surface of the bar or movable object 250. The plate 251 is provided with a longitudinally extending slot 263 through which the proximal portions of the gear 261 and rack 262 loosely extend.

A position pointer 234' is fixed to the medial portion of the bar 250 and extends outwardly therefrom over one of the ribs 252 and overlies a suitable graduated indicating plate 230' (Figures 17 and 18). The indicating plate 230' is suitably secured to the upper surface of the plate 251 of the frame 257. The bar or movable object 250 also has a pair of spaced switch engaging elements or abutments 220' and 221' suitably secured thereto which are provided to serve substantially the same purpose as the cams 220 and 221 in Figure 4 and that they are adapted to ultimately engage plungers 224', 225' of respective normally closed switches 200', 201' upon failure of the motor 31' stopping as a result of malfunction of the means controlling the circuit to the electric motor 31'. The housings of the switches 200', 201' are suitably secured to the upper surface of the plate 251 of the frame 257.

*Modified or second form of manual control unit*

Referring to Figures 12, 16 and 19 to 22, inclusive, there is shown a manual control unit which is disposed within a box-like housing or framework broadly designated at 65' and which includes a top wall 66', a bottom wall 67' and four interconnecting side walls 70', 71', 72' and 73'.

Now, as heretofore stated, the primary difference between the modified form of control unit disposed in housing 65' and the original or first form of control unit disposed in the housing carried by the frame 65 lies in the fact that the control is manually movable in a straight path rather than an arcuate path and those parts in the modified or second form of the invention which function in substantially the same manner as similar parts in the original or first form of the invention shall bear the same reference characters with the prime notation added.

In the second or modified form of the invention, a straight or planar graduated gauge bar 110' extends longitudinally beneath the top wall 66' of the frame 65' and is spaced therefrom by means of suitable spacing members or blocks 270, the blocks 270 being suitably secured to the proximal surfaces of the wall 66' and the gauge bar 110'. The top wall 66' of the frame 65' is provided with a longitudinally extending sight opening or slot 111' therein which is closed by a transparent or glass window or plate 112' carried by a frame 115' suitably secured to the upper surface of the wall 66'. The position pointer 107' in Figure 19 is of substantially inverted L-shaped configuration and the vertical leg thereof is suitably secured to the medial portion of a slide or guide block 271 mounted for longitudinal sliding movement on upper and lower rods or bars 272 and 273. It will be observed in Figures 21 and 22 that opposite ends of the guide bars or rods 272 and 273 are suitably secured to the vertically disposed frame members or walls 72', 73' of the frame 65'. The lower edge of the slide or guide bar or block 271 has a rack 97' suitably secured thereto, or integral therewith which matches a pinion or gear 106' fixed on a shaft 212' of a transmitter or first selsyn 206'.

Spaced from the slide or guide block 271 is a slide or guide block 130' to which the vertical leg of an inverted substantially L-shaped order pointer or indicating pointer 113' is suitably secured. The guide block 130' which may also be termed as an oscillator coil carrier, is mounted for longitudinal sliding movement on upper and lower guide bars 274, 275 disposed in substantially parallel relation to the guide bars or rods 272, 273 and also being suitably secured at opposite ends thereof to the vertical frame members or walls 72', 73' of the frame 65'. The guide block or oscillator coil carrier 130' has a relatively small projection 93' extending therefrom which loosely penetrates an opening 276 provided therefore in the upper portions of the front walls 70' of the frame 65' (Figures 15 and 19). A suitable handle 94' is suitably secured to the outer end of the projection 93'.

It will be observed in Figures 19, 20 and 22 that the inner surface of the coil carrying bar or slide 130' supports two sets of two oscillator coils 132', 133' and 134', 135' which are spaced from each other so that the center points of each set of oscillator coils are spaced from each other a distance slightly greater than the length of a metallic vane 131'. The metallic vane 131' is suitably secured to the vane carrying block or slide 271, heretofore described.

The two sets of oscillator coils 132', 133' and 134', 135' are mounted on the block 130' in substantially the same manner as the oscillator coils 132, 133 and 134, 135 are mounted on the segmental plate 130 and adjustment may be provided by screws 146' and 144' (Figure 20). Therefore, a detailed description thereof is deemed unnecessary.

The electrical circuit for both forms of the invention may be identical and, therefore, an illustration and description of the electrical circuit for the modified or second form of the invention is deemed unnecessary.

In order to assist in maintaining the oscillator coil carrier or slide 130' in the desired position so the order pointer 113' is maintained in alinement with a preselective graduation on the gauge plate 110', the projection 93' has a spring pressed detent 280 mounted therein which is urged into engagement with an indexing bar 281 provided with a plurality of transverse slots 282 in the upper surfaces thereof, there being one of these slots 282 coinciding with each of the graduations on the gauge plate or bar 110'.

It is thus seen that by shifting the coil carrier or slide 130' in either direction, the reversible electric motor 31' is energized to move the bar or movable object 250 in a corresponding direction. Of course, rotation is then imparted to the shaft 215' of the selsyn 207' which causes the shaft 212 of the selsyn 206' to rotate in a like manner to impart movement to the slide 271 and the position pointer 107' until the position pointer is alined with the order pointer 113' in the same manner as heretofore described for the similar parts of the first form of the invention. It is evident that the circuit to the electric motor 31' is open or broken immediately upon the vane 131' moving to a balanced position relative to the oscillator coils 132', 133', 134', 135'.

It is thus seen that we have provided improved electrical control means which will control the position of any article regardless of its weight, size or dimension, the only limitation being the strength of the electric motor 31', and wherein the position of the movable article may be varied by remote control, at the will of the operator, within extremely close tolerances. In actual practice it has been possible to control movement and position of an object to one-thousandths of an inch under various loads.

As previously stated, there are many different purposes for which the improved control means may be used and, although the movable object or shaft 10 has hereinbefore been described as a control rod for a variable pitch propeller of a ship, this is merely to be construed as a typical application of the present invention and not as a limitation. As a matter of fact, either form of the improved apparatus may be used for remotely controlling the position of a throttle for any type of engine or a gear shift lever or upon controlling position of any of the many movable parts of an automatic lathe or for controlling the position or operation of any element which is incapable of being accurately controlled either manually or by other automatic means.

Although only two selsyns are employed in the circuit for each form of the invention, it is evident that any desired number of units, such as that shown in the upper portion of Figure 1 or such as that shown in the upper portion of Figure 15 may be accurately controlled in synchronism by connecting the secondary windings of all of the selsyns to each other in the same manner in which the secondary windings S-1, S-2 and S-3 of the selsyns 206 and 207 are connected.

By use of the novel remote control means of this invention in combination with a motor for positioning an object, it is possible to control various types of objects and various types of motors. Any size motor may be used and the amount of load to be moved is limited only by the capacity of the largest possible motor. Under heavy load conditions it is not necessary to build large, complicated rigs or the like to control the motor, but the simple convenient remote control unit of this invention may be used under both large and small load conditions with a degree of accuracy which has heretofore been unobtainable In the drawings and specification, there has been set forth a preferred embodiment of the invention and, although specific terms are employed, they are used in a generic and descriptive sense only and not for purposes of limitation, the scope of the invention being defined in the claims.

We claim:

1. In a control system for controlling the position of a movable object, having a reversible electric motor, mechanical connections between the electric motor and the movable object, a first normally opened relay switch for effecting rotation of the electric motor in one direction, a second normally opened relay switch for effecting rotation of the electric motor in a second opposite direction, a transmitter selsyn driven by the electric motor and a receiver selsyn electrically connected to and driven by the transmitter selsyn; the combination of a control unit including a pair of spaced sets of oscillator coils, each set including two spaced coils, a metallic vane movable between the two coils of said sets of oscillator coils, means operable automatically for closing said first switch upon movement of said vane in a first direction relative to said oscillator coils, means operable automatically for closing said second relay switch upon movement of said vane in a second opposite direction relative to said oscillator coils, whereby closing of said first and second relay switches will impart rotation in the respective first and second directions to the electric motor to thereby effect synchronized rotation of said transmitter and receiver selsyns, and means operable automatically for effecting relative movement between the pair of sets of oscillator coils and the vane during rotation of the electric motor until the vane is again disposed in balanced position.

2. In an apparatus for controlling the position of a movable object, said apparatus having a reversible electric motor, a first switch means, a second switch means, electrical connections between the first and second switch means and the electric motor for respectively imparting rotation to the electric motor in first and second directions, a transmitter selsyn driven by the electric motor and a receiver selsyn electrically connected with the transmitter selsyn and adapted to move in synchronism with the transmitter selsyn; the combination of a movable metallic vane of predetermined length, a driving connection between the receiver selsyn and the movable vane, a first pair of spaced oscillator coils, a second pair of spaced oscillator coils, said first and second pairs of oscillator coils normally being positioned adjacent the end portions of the movable vane, said first and second pairs of oscillator coils being manually movable in unison astride and out of contact with said vane, means operable automatically upon moving said pairs of oscillator coils in one direction for closing the first switch to impart rotation to the motor in said first direction, and means operable automatically upon moving the pairs of oscillator coils in the opposite or second direction for closing the second switch to impart rotation to the electric motor in the second direction whereby rotation of the electric motor in either direction will impart corresponding movement to the transmitter selsyn which will cause the receiver selsyn to move in rotating unison therewith and whereby the receiver selsyn will move the metallic vane to a position where opposite ends thereof are again positioned equidistant between the first and second pairs of oscillator coils.

3. In an apparatus for controlling the position of a movable object, said apparatus having a reversible electric motor provided with a shaft, mechanical connections between said motor shaft and the movable object, a first transmitter selsyn having a rotatable shaft, driving connections between the transmitter selsyn shaft and the motor shaft, a second receiver selsyn having a shaft driven thereby, secondary windings in each of said selsyns, electrical connections between the secondary windings of said first and second selsyns, and first and second normally open relay switches for effecting rotation of the motor shaft in respective first and second directions when closed; the combination of a manually movable member, first and second spaced pairs of spaced oscillator coils on said manually movable member, electrical connections between the first pair of coils and the first relay switch, electrical connections between the second pair of coils and the second relay switch, a movable metallic vane of a length less than the distance between the points of excitation of each of said pairs of oscillator coils and having the opposite ends thereof disposed adjacent the coils of the first and second pairs of coils when said vane is balanced relative thereto, mechanical connections between the receiver selsyn shaft and the movable vane whereby manual movement of said manually movable member will move the coils out of balance relative to the metallic vane to close one of said relay switches for imparting movement to the movable object and the transmitter selsyn shaft and whereby the transmitter selsyn will effect rotation of the receiver selsyn shaft in synchronism therewith to move the vane until it is again balanced relative to the coils to break the circuit to said last-named relay switch.

4. In an apparatus for controlling the position of a movable object, said apparatus having a reversible electric motor mechanically connected to the movable object; the combination of spaced first and second pairs of spaced manually movable oscillator coils, means for supporting said coils in fixed relation to each other, a metallic vane movable between the points of excitation of said first and second pairs of oscillator coils, first and second relays for causing said motor to rotate in one direction and the opposite direction, respectively, when the respective relays are actuated, means responsive to manual movement of said coils relative to said vane in one direction to actuate the first relay and thereby effect rotation of the motor in said one direction, means responsive to manual movement of said coils relative to said vane in the opposite direction to actuate the second relay and thereby effect rotation of the motor in said opposite direction, means for automatically moving the metallic vane upon rotation of the electric motor in either direction until the vane occupies a balanced position between the oscillator coils, and said vane, when in the latter position, causing de-activation of said relays to thereby stop the motor.

5. In an apparatus for controlling the position of a movable object, said apparatus having a reversible electric motor provided with a shaft mechanically connected to the movable object; the combination of first and second spaced sets of spaced oscillator coils movable in fixed relation to each other, a metallic vane movable between the points of excitation of said first and second sets of oscillator coils to interrupt the oscillation therebetween, manually operable means for effecting relative movement between the vane and the first and second sets of oscillator coils, first and second relays for respectively causing said motor to rotate in one and the opposite directions, means operable automatically upon relative movement between the vane and the sets of oscillator coils in one direction to actuate the first relay for effecting rotation of the electric motor in said one direction, means operable automatically upon effecting relative movement between the vane and the oscillator coils in the opposite direction to actuate the second relay for effecting rotation of the electric motor in said opposite direction, and automatic means for effecting relative movement between the metallic vane and the oscillator coils upon rotation of the electric motor in either direction until the relative position of the metallic vane and the oscillator coils is again such that opposite ends of the metallic vane are not disposed between the points of excitation of either of said first and second sets of oscillator coils.

References Cited in the file of this patent

UNITED STATES PATENTS

| | | |
|---|---|---|
| 2,505,555 | Levy | Apr. 25, 1950 |
| 2,527,797 | Cohen | Oct. 31, 1950 |
| 2,575,357 | Nichols | Nov. 20, 1951 |
| 2,576,611 | Lang et al. | Nov. 27, 1951 |
| 2,638,006 | Feustel | May 12, 1953 |
| 2,664,531 | Nakasone | Dec. 29, 1953 |

FOREIGN PATENTS

| | | |
|---|---|---|
| 568,148 | Great Britain | Mar. 21, 1945 |